US006661886B1

(12) United States Patent
Huart et al.

(10) Patent No.: US 6,661,886 B1
(45) Date of Patent: Dec. 9, 2003

(54) METHOD AND SYSTEM FOR REAL-TIME MONITORING OF VOICE MAIL DURING ACTIVE CALL

(75) Inventors: Pascal H. Huart, Dallas, TX (US); Luke K. Surazski, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 09/703,385

(22) Filed: Oct. 31, 2000

(51) Int. Cl.[7] .............................................. H04M 1/64
(52) U.S. Cl. ............................. 379/215.01; 379/88.17; 379/207.01; 379/215.01
(58) Field of Search ........................... 379/67.1, 70, 81, 379/93.04, 93.35, 215.01, 88.13, 88.17, 201.07, 201.01, 207.01, 202.01

(56) References Cited

U.S. PATENT DOCUMENTS

| | | | |
|---|---|---|---|
| 5,652,789 A | 7/1997 | Miner et al. ................. 379/201 |
| 5,717,741 A | 2/1998 | Yue et al. ...................... 379/67 |
| 5,894,504 A * | 4/1999 | Alfred et al. ............. 379/88.13 |
| 6,021,181 A | 2/2000 | Miner et al. ............. 379/88.23 |
| 6,047,053 A | 4/2000 | Miner et al. ................. 379/201 |
| 6,192,116 B1 | 2/2001 | Mayak ........................ 379/142 |
| 6,192,120 B1 | 2/2001 | Yamagishi et al. .......... 379/215 |
| 6,212,261 B1 | 4/2001 | Meubus et al. ........... 379/88.12 |
| 6,259,471 B1 | 7/2001 | Peters et al. ................... 348/17 |
| 6,282,270 B1 | 8/2001 | Porter ..................... 379/88.17 |
| 6,337,898 B1 | 1/2002 | Gordon ..................... 379/67.1 |
| 6,343,121 B1 | 1/2002 | Infosino ................. 379/215.01 |
| 6,385,202 B1 | 5/2002 | Katseff et al. ............... 370/401 |
| 6,396,908 B1 | 5/2002 | O'Donovan et al. ..... 379/88.18 |
| 6,434,143 B1 | 8/2002 | Donovan ..................... 370/356 |
| 6,463,146 B1 | 10/2002 | Hartley et al. ......... 379/215.01 |
| 6,487,196 B1 * | 11/2002 | Verthein et al. ............. 370/352 |
| 6,507,646 B1 * | 1/2003 | Fishler ................... 379/215.01 |
| 6,560,224 B1 * | 5/2003 | Kung et al. .................. 370/356 |

* cited by examiner

*Primary Examiner*—Fan Tsang
*Assistant Examiner*—Olisa Anwah
(74) *Attorney, Agent, or Firm*—Baker Botts L.L.P.

(57) ABSTRACT

A method and system for real-time monitoring voice mail during an active call includes generating a duplicate of a calling party voice stream being recorded by voice mail for a called party on a call with a previously connected party. The duplicate calling party voice stream is combined with a previously connected party voice stream to generate a combined voice stream for the called party. The combined party stream is played to the called party during the call.

58 Claims, 2 Drawing Sheets

METHOD AND SYSTEM FOR REAL-TIME MONITORING OF VOICE MAIL DURING ACTIVE CALL

RELATED APPLICATION

This application is related to co-pending U.S. patent application Ser. No. 09/703,341, entitled Method and System for Call Answer While Connected to Voice Mail, filed on Oct. 31, 2000.

TECHNICAL FIELD OF THE INVENTION

The present invention relates generally to the field of communications systems, and more particularly to a method and system for real-time monitoring of voice mail during an active call.

BACKGROUND OF THE INVENTION

Telecommunication networks include circuit-switched networks such as plain old telephone service (POTS) and packet-switched networks such as the Internet protocol (IP) network to transport voice and data between remote end users. The circuit-switched networks utilize, transmission paths dedicated to specific users for the duration of a call and employ continuous, fixed bandwidth transmission. The packet-switched networks allow dynamic bandwidth, and can be connectionless networks with no dedicated path or connection-oriented networks with virtual circuits having dedicated bandwidth along a predetermined path. Because packet-switched networks allow traffic from multiple users to share communication links, these networks use available bandwidth more efficiently than circuit-switched networks.

IP networks are connectionless packet-switched networks that break up streams of information into addressable packets. Each IP packet includes source and destination addresses and can take any available route between the source and destination. The IP packets are transmitted independently and then reassembled in the proper sequence at the destination.

In IP and other networks, voice mail systems are used to record an audio message from a calling party for an absent, busy or otherwise unavailable called party. Although most telephone systems provide for multiple lines, line appearances and call waiting, such systems do not allow a busy called party to determine the caller and/or the purpose of a call transferred to voice mail without terminating the current call temporarily or indefinitely. As a result, time sensitive and other important calls are missed.

SUMMARY OF THE INVENTION

The present invention provides a method and a system for real-time monitoring of voice mail during an active call that substantially eliminate or reduce problems and disadvantages associated with previous systems and methods. In particular, a called party is able to maintain an active connection while listening to incoming voice mail.

In accordance with one embodiment of the present invention, a method and system for monitoring voice mail during an active call includes generating a duplicate of a calling party voice stream being recorded by voice mail for a called party on a call with a previously connected party. The called party voice stream is combined with a previously connected voice stream to generate a combined voice stream for the called party. The combined party voice stream is played to the called party during the call.

More specifically, in accordance with a particular embodiment of the present invention, a return connection from the called party to the calling party can be established in response to a request by the called party while maintaining the call. In this embodiment, the called party voice stream is switched from the previously connected party to the calling party in response to the request by the called party. The called party voice stream is switched from the calling party back to the previously connected party in response to a call resumption request by the called party. The return request is then terminated.

Technical advantages of the present invention include providing a method and a system for real-time monitoring of voice mail during an active call. In a particular embodiment, a called party is able to maintain an ongoing connection while listening to incoming voice mail for urgent requests. Thus, the linearity and limitations of current telephone systems are overcome.

Another technical advantage of one or more embodiments of the present invention include allowing a called party to pick up a call routed to voice mail while still maintaining a preexisting active connection. In particular, the called party may establish a return connection with a party leaving a message in voice mail and switch his or her voice between the connections.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
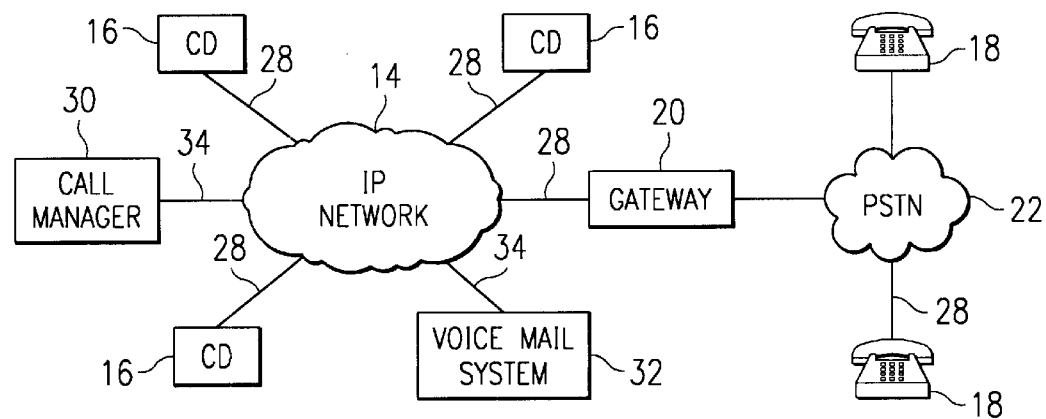
FIG. 1 is a block diagram illustrating a communications system in accordance with one embodiment of the present invention.

FIG. 1 illustrates a communications system 12 in accordance with one embodiment of the present invention. In this embodiment, the communications system 12 is a distributed system transmitting audio, video, voice, data and other suitable types of real-time and non-real time traffic between source and destination endpoints.

Referring to FIG. 1, the communications system 12 includes a network 14 connecting a plurality of communication devices 16 to each other and to standard analog telephones 18 through a gateway 20 and the public switched telephone network (PSTN) 22. The communication devices 16, standard analog telephones 18 and gateway 20 are connected to the network 14 and/or PSTN 22 through twisted pair, cable, fiber optic, radio frequency, infrared, microwave and/or any other suitable wireline or wireless link 28.

In one embodiment, the network 14 is the Internet, a wide area network (WAN), a local area network (LAN) or other suitable packet-switched network. In the Internet embodiment, the network 14 transmits Internet Protocol (IP) packets. Telephony voice information is transmitted in the voice over IP (VoIP) format. Real-time IP packets such as VoIP packets are encapsulated in real-time transport protocol (RTP) packets for transmission over the network 14. It will be understood that the network 14 may comprise any other suitable type of network and that traffic may be otherwise suitably transmitted using other protocols and formats.

The communication devices 16 are real-time applications that play traffic as it is received, or substantially as it is received into which packet delivery cannot be interrupted without severely degrading performance. The communication devices 16 comprise IP or other digital telephones, personal and other suitable computers or computing devices, personal digital assistants (PDAs), cell or other mobile telephones or any other device capable of communicating real-time audio, video and/or other information over the network 14. The communication devices 16 also communicate control information with the network 14 to control call setup, teardown and processing as well as call services.

In the Internet embodiment, the communication devices 16 communicate voice traffic in the VoIP format. The standard analog telephones 18 communicate standard telephony signals through PSTN 22 to the gateway 20. At the gateway 20, the signals are converted to IP packets in the VoIP format. As previously described, the IP packets from the communication devices 16 and the gateway 20 are encapsulated in the RTP protocol for transmission over the network 14.

The network 14 includes a call manager 30 and a voice mail system 32 or other suitable non real-time applications such as an interactive voice response (IVR) system. The call manager 30 and the voice mail system 32 may be located in a central facility or have their functionality distributed across and/or at the periphery of the network 14. The call manager 30 and the voice mail system 32 are connected to the network 14 by any suitable type of wireline of wireless link 34. In another embodiment, the network 14 may operate without the call manager 30, in which case the communication devices 16 may communicate control information directly with each other or with other suitable network elements. In this embodiment, services are provided by the communication devices 16 and/or other suitable network elements.

The call manager 30 manages calls in the network 14. A call is any communication session between two or more parties. The parties may be persons and/or equipment such as computers. The sessions may include real-time connections, connections having real-time characteristics and/or non-real-time connections.

The call manager 30 is responsive to service requests from the communication devices 16 and the standard telephones 18. For example, the call manager 30 may provide voice mail, bridging,-multicasting, call hold and other suitable services for the communication devices 16 and standard telephones 18. In one embodiment, the call manager 30 includes a voice mail monitoring controller operable to provide voice mail monitoring services to callers on active calls through the communication devices 16. The call manager 30 provides services by performing the services, controlling performance of the services, delegating the services and/or by otherwise initiating the services.

The voice mail system 32 is a non real-time application. Thus, while the voice mail system 32 receives real-time voice traffic, the traffic is being recorded for a later use. The voice mail system 32 records voice messages for a busy, absent or otherwise unavailable called party.

Typically, unanswered calls to a called party are automatically switched from the communication device 16 of the called party to the voice mail system 32 by the call manager 30 after a predefined number of rings. As described in more detail below, the call manager 30 in connection with the voice mail system 32 and a called party communication device 16 allows the called party to monitor voice mail during an active call without terminating the call and to switch to or between the call and the calling party leaving the voice mail message. Thus, users may remain on a call, without interruption, while monitoring incoming calls for urgent requests.

Figure 2:
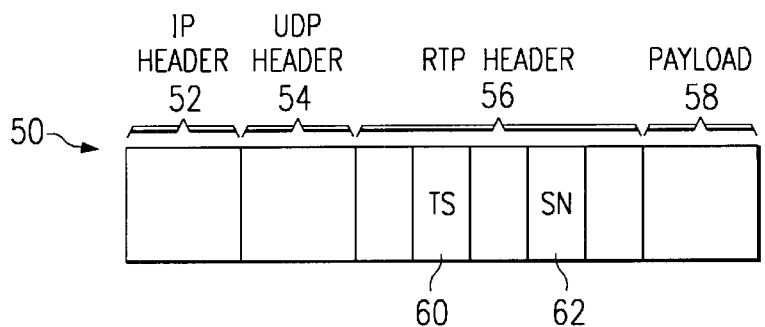
FIG. 2 is a block diagram illustrating details of a real-time transport protocol (RTP) packet for communicating information over the communications system of FIG. 1 in accordance with one embodiment of the present invention.

FIG. 2 illustrates an RTP packet for transmission of real-time traffic over the communications system 12 in accordance with one embodiment of the present invention. Real-time traffic comprises traffic generated or transmitted in real-time or including real-time information such as voice traffic.

Referring to FIG. 2, the RTP packet 50 includes an IP header 52, a user datagram protocol (UDP) header 54, an RTP header 56 and a payload 58. The IP header 52 includes source IP address and destination IP address for directing the RTP packet in the network 14. Traffic is directed by switching the traffic, routing the traffic or otherwise forwarding the traffic along a predefined path or between predefined endpoints.

The UDP header 54 provides a source port, a destination port and a sequence number. The RTP header 56 includes timing indicators to allow reordering of RTP packets at a destination endpoint and determination of whether any packets have been dropped or lost during transmission over the network 14. The timing indicators may be any suitable type of information in one or more segments of a packet operable alone or in combination with other information to determine an order, sequence or other relative or absolute temporal placement of RTP packets 50. The payload 58 carries voice or other information being communicated in the RTP packet 50.

In one embodiment, the timing indicators of the RTP header 56 include a time stamp 60 and a sequence number 62. The time stamp 60 and the sequence number 62 indicate to a destination device the order of the RTP packets 50, when to play the audio samples and whether any intervening RTP packets 50 have been lost or dropped by the network 14. Accordingly, by controlling the time stamp 60 and sequence number 62 or other timing indicator of the RTP header 56, a source communication device 16 can control treatment of the RTP packet 50 by a destination device.

In a particular embodiment, the time stamp 60 and/or sequence number 62 may be controlled by the communication device 16 when switching an output voice stream between an active call and a calling party or other disparate devices such that the switching is transparent to the disparate destination devices and/or the destination devices do not initiate error correction processing for missing packets. Thus, for example, a different set of sequence numbers may be used for traffic sent to each of the disparate devices such that the audio sent is played properly. Similarly, disparate sets of time stamp 60 may be used for transmissions to the disparate devices.

Figure 3:
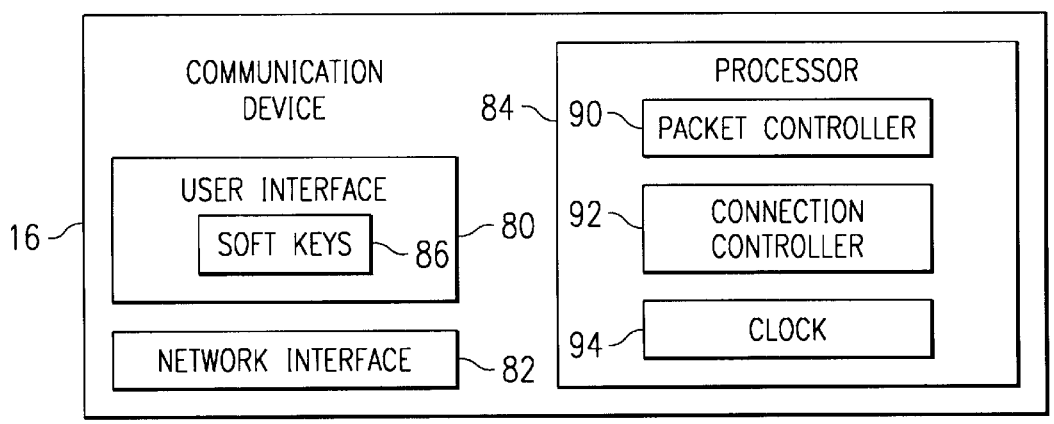
FIG. 3 is a block diagram illustrating details of a communication device for the communications network of FIG. 1 in accordance with one embodiment of the present invention.

FIG. 3 illustrates detail of the communication device 16 in accordance with one embodiment of the present invention. In this embodiment, the communication device 16 is a VoIP telephone connected to the network 14 over a data cable. The communication device 16 may include other or different suitable elements for communicating traffic over the network 14.

Referring to FIG. 3, the communication device 16 includes a user interface 80, a network interface 82 and a processor 84. The user interface 80, network interface 82, processor 84 and other elements of the communication device comprise logic encoded in media. The logic comprises functional instructions for carrying out programmed tasks. The media comprises computer disks or other suitable computer-readable media, application specific integrated circuits (ASIC), field programmable gate arrays (FPGA) or other suitable specific or general purpose processors, transmission media and other suitable media in which logic may be encoded and utilized.

The user interface 80 is a graphical, text base and/or other suitable interface operable to display commands and receive requests and selections from end users. In one embodiment, the user interface 80 includes soft keys 86 for selection by the user. The features associated with each of the soft keys 86 vary depending on the state of the communication device 16. As used herein, each means every one of at least a subset of the identified items.

The network interface 82 receives and transmits data to and from the network 14. In one embodiment, the network interface 82 includes an IP address and one or more ports for identifying the communication device 16 and/or application to other devices on the network. The processor 84 is a general purpose or other suitable processor processing logic and other operating instructions for the communication device 16.

The processor 84 includes a packet controller 90, connection controller 92 and clock 94. The packet controller 90 codes and decodes RTP packets transmitted on and received from the network 14. The connection controller 92 controls a destination of a voice connection from the communication device 16. In one embodiment, the connection controller 92 allows the end user to toggle or otherwise switch between two or more connections including between an active call and a connection to a party leaving a message in the voice mail system 32. A clock 94 generates time stamps 60 for the RTP packets.

The packet controller 90 tracks the sequence number of each output audio stream and updates the stream for each successive packet to allow the packets to be properly reordered and played at their destination. The packet controller 90 also inserts time stamps 60 derived from the clock 94. In addition, the packet controller 90 may store, modify and adapt time stamps 60 and sequence number 62 when an output audio stream is directed between disparate devices such that the switching is transparent to the disparate destination devices.

Figure 4:
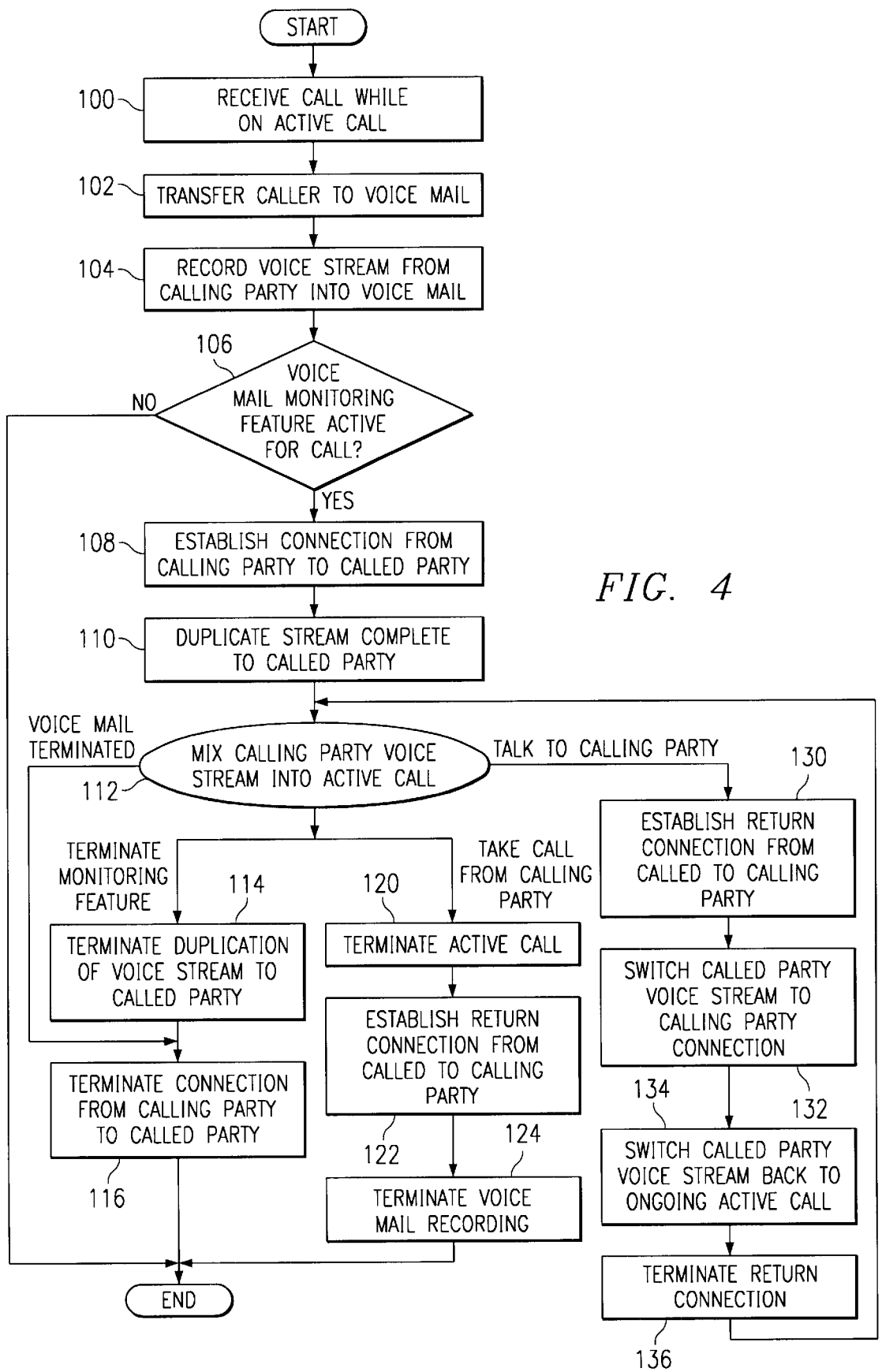
FIG. 4 is a flow diagram illustrating a method for real-time monitoring of voice mail during an active call in accordance with one embodiment of the present invention.

FIG. 4 illustrates a method for real-time monitoring of voice mail during an active call in accordance with one embodiment of the present invention. In this embodiment, the end user may enable and disable the voice mail monitoring feature. In addition, the end user may only enable the voice mail monitoring feature for certain types of calls, calls received on certain lines, calls received at certain times, from certain calling parties and/or devices or based on other suitable criteria associated with a calling party. It will be understood that the voice mail monitoring feature may be continuously or otherwise active.

Referring to FIG. 4, the method begins at step 100 in which a call is received by a party on an active call. Accordingly, at step 102, the caller is transferred to the voice mail system 32. At step 104, the voice mail system 32 records the voice stream from the calling party as a voice message for the called party.

Proceeding to decisional step 106, the call manager 30 determines whether the voice mail monitoring feature is active for the call. In one embodiment, the voice mail monitoring feature is active for the call if it is active for all calls or if it is available based on the type and/or identity of the calling party. Thus, the user can enable or disable the voice mail monitoring feature on a per call basis based on an incoming caller ID on his or her telephone. If the voice mail monitoring feature is not active for the call, the No branch of decisional step 106 leads to the end of the process. Accordingly, the end user is able to control when and what types of voice mail messages to monitor.

If the voice mail monitoring feature is active for the call, the Yes branch of decisional step 106 leads to step 108. At step 108, a connection is established from the calling party to the called party. At step 110, the voice stream recorded by voice mail is duplicated and provided for the called party. The voice stream may be duplicated by the source communication device 16 or the gateway 20, by the voice mail system 32, the call manager 30 or an intermediate network element. The voice stream may be duplicated by multicasting the voice stream or copying voice data in the voice stream and transmitting the copy in an additional RTP stream toward the called party.

Next, at state 112, the calling party, voice stream is mixed or otherwise suitably combined with the voice stream of the active call to generate a combined voice stream played to the called party on the active call. The streams may be combined by the communication device 16, the gateway 20, call manager 30 and/or other stand alone device. In one embodiment, the communication device 16 uses its internal digital signal processing (DSP) resources to decode the voice streams and to mix the voice mail stream into a combined stream at a lower level than the current call. The called party hears the active call at the normal level and voice mail at a lower level. The other party on the active call is unaware of the voice mail call. Thus, the called party may remain on the active call and at the same time listen to the message being left with the voice mail system 32. The called party may have the option through softkeys or other commands to set or preset the volume or other suitable feature of one or both voice streams in order to be able to better acoustically distinguish the two connections.

In response to receipt of a request by the called party to terminate voice mail monitoring for the current call, state 112 transitions to step 114 in which duplication of the voice stream to the called party is terminated. Accordingly, the called party may decide the message is unimportant or can be later answered or responded to and eliminate further interference with the ongoing active call. Step 114 leads to step 116 in which the connection from the calling party to the called party is terminated. Step 116 leads to the end of the process by which voice mail is monitored.

Returning to monitoring state 112, the called party may decide to take the call from the calling party leaving the voice mail message in place of the active call. In response to this selection, state 112 transitions to step 120. At step 120, the active call is terminated to allow the end user to focus all of his or her attention on an urgent or other matter about which the calling party was calling. At step 122, a return connection from the called party to the calling party is established to allow two-way communication between the called party and calling party. Next, at step 124, the voice mail recording is terminated in the voice mail system 32. In an alternate embodiment, the voice mail recording may continue to allow the voice of the calling party and/or the called party to be recorded for later playback by the called party. Step 124 leads to the end of the process by which a party on an active call may monitor a voice mail message and accept the connection with the calling party in place of the preexisting active connection.

Returning again to monitoring state 112, the called party may select to talk to the calling party leaving the voice mail message while maintaining the active call and still receiving both audio streams. In response to this selection, state 112 transitions to step 130 in which a return connection is established from the called party to the calling party. In this embodiment, the called party is receiving a combined audio stream from a preexisting connection and from a connection with the calling party and has a connection to a party on the preexisting call and a connection to the calling party leaving the voice mail message. At step 132, the voice stream of the called party is switched to the calling party connection. The voice stream is switched by being transferred, switching holds, using call waiting functionality or otherwise redirecting the stream. Thus, the called party may talk to the calling party while still maintaining the preexisting active call.

At step 134, the called party may switch the outgoing voice stream back to the ongoing active call when finished talking to the calling party or needed for the active call. As previously described, the sequence number may be tracked separately for each outgoing stream. The time stamp 60, sequence number 62 and/or other suitable timing indicators may be tracked, reset, stored or based on different sets of information for the ongoing active call and the calling party connection without departing from the scope of the present invention. Next, at step 136, the return connection to the calling party is terminated to free up network 14 resources. In an alternate embodiment, the calling party connection may be maintained until the end of the active call, the end of the calling party's connection to the voice mail system 32 or for a suitable predetermined period of time after the called party has utilized the connection.

Step 136 returns to monitoring state 112 in which the called party may continue to monitor the message being left by the calling party while maintaining the active call. Thus, the called party may briefly talk to the calling party to request the calling party to leave certain or detailed information that will allow the called party to address the issue about which the calling party is calling. The called party may at any time choose to again talk to the calling party by selecting the talk to calling party soft key on the communication device 16.

At monitoring state 112, upon termination of the voice mail message, duplication of the calling party voice stream is automatically terminated and state 112 transitions to step 116 in which the connection from the calling party to the called party is terminated. As previously described, step 116 leads to the end of the process by which an end user may monitor in real-time voice mail during an active call.

Although the present invention has been described with several embodiments, various changes and modifications may be suggested to one skilled in the art. It is intended that the present invention encompass those changes and modifications as fall within the scope of the claims.

What is claimed is:

1. A method for monitoring voice mail during an active call, comprising:

generating a duplicate of a calling party voice stream being recorded by voice mail for a called party currently on a call connection with a previously connected party;

combining the duplicate calling party voice stream with a voice stream of the previously connected party to generate a combined voice stream for the called party; and playing the combined voice stream to the called party during the call connection.

2. The method of claim 1, further comprising generating the duplicate calling party voice stream by multicasting the calling party voice stream being recorded by voice mail.

3. The method of claim 1, further comprising generating the duplicate calling party voice stream by copying voice data of the calling party voice stream being recorded by voice mail.

4. The method of claim 1, further comprising differentiating between the previously connected party and the calling party in the combined voice stream.

5. The method of claim 4, further comprising combining the calling party voice stream into the combined voice stream at a lower level than the previously connected party voice stream.

6. The method of claim 1, wherein the calling party voice stream and the previously connected party voice stream comprise real-time transport protocol (RTP) packets.

7. The method of claim 1, wherein at least one of the previously connected party and the calling party are connected to the called party through a gateway on an analog phone.

8. The method of claim 1, further comprising:

determining whether a monitoring feature is active for the called party; and combining the calling party voice stream with the previously connected party voice stream to generate the combined voice stream for the called party if the monitoring feature is active.

9. The method of claim 1, further comprising:

determining whether a monitoring feature for the called party is available to the calling party; and combining the calling party voice stream with the previously connected party voice stream to generate the combined voice stream for the called party if the monitoring feature is available to the calling party.

10. The method of claim 1, further comprising terminating combining of the calling party voice stream with the previously connected party voice stream to generate the combined voice stream for the called party in response to at least termination of a monitoring feature by the called party.

11. The method of claim 1, further comprising:

in response to at least a request by the called party, establishing a return connection from the called party to the calling party while maintaining the call; and directing a called party voice stream to the calling party over the return connection.

12. The method of claim 11, further comprising terminating the call in response to at least a request by the called party.

13. The method of claim 12, further comprising terminating a voice mail recording of the calling party in response to at least termination of the call in progress by the called party in favor of a connection with the calling party.

14. The method of claim 11, further comprising switching the called party voice stream from the previously connected party to the calling party in response to at least the request by the called party.

15. The method of claim 14, further comprising switching the called party voice stream from the calling party back to the previously connected party in response to at least a call resumption request by the called party.

16. The method of claim 15, further comprising terminating the return connection in response to at least the call resumption request by the called party.

17. A system for real-time monitoring of voice mail during an active call, comprising:
   logic encoded on media; and
   the logic operable to combine a duplicate of a calling party voice stream being recorded by voice mail, for a called party on a call with a previously connected party, with a previously connected party voice stream to generate a combined voice stream for the called party and to play the combined voice stream to the called party during the call.

18. The system of claim 17, the logic further operable to differentiate between the previously connected party and the calling party in the combined voice stream.

19. The system of claim 17, the logic further operable to combine the calling party voice stream into the combined voice stream at a lower level than the previously connected party voice stream.

20. The system of claim 17, wherein the calling party voice stream and the previously connected party voice stream comprise real-time transport protocol (RTP) packets.

21. The system of claim 17, wherein at least one of the previously connected party and the calling party are connected to the call party through a gateway on an analog phone.

22. The system of claim 17, the logic further operable to determine whether a monitoring feature is active for the called party and to combine the calling party voice stream with the previously connected party voice stream to generate the combined voice stream for the called party if the monitoring feature is active.

23. The system of claim 17, the logic further operable to determine whether a monitoring feature for the called party is available to the calling party and to combine the calling party voice stream with the previously connected party voice stream to generate the combined voice stream for the called party if the monitoring feature is available to the calling party.

24. The system of claim 17, the logic further operable to terminate combining of the calling party voice stream with the previously connected party voice stream to generate the combined voice stream for the called party in response to at least termination of a monitoring feature by the called party.

25. The system of claim 17, the logic further operable in response to at least a request by the called party to establish a return connection from the called party to the calling party while maintaining the call and to direct a called party voice stream to the calling party.

26. The system of claim 25, the logic further operable to terminate the call in response to at least a request by the called party.

27. The system of claim 26, the logic further operable to terminate a voice mail recording of the calling party in response to at least termination of the call by the called party in favor of a connection with the calling party.

28. The system of claim 25, the logic further operable to switch the called party voice stream from the previously connected party to the calling party in response to at least the request by the called party.

29. The system of claim 28, the logic further operable to switch the called party voice stream from the calling party back to the previously connected party in response to at least a call resumption request by the called party.

30. The system of claim 29, the logic further operable to terminate the return connection in response to at least the call resumption request by the called party.

31. A system for real-time monitoring of voice mail during an active call, comprising:
   means for generating a duplicate of a calling party voice stream being recorded in voice mail for a called party currently on a call connection with a previously connected party;
   means for combining the duplicate calling party voice stream with a previously connected voice stream to generate a combined voice stream for the called party; and
   means for playing the combined voice stream to the called party during the call connection.

32. The system of claim 31, further comprising means for generating the duplicate calling party voice stream by multicasting the calling party voice stream being recorded by voice mail.

33. The system of claim 31, further comprising means for generating the duplicate party voice stream by copying the calling party voice stream being recorded by voice mail.

34. The system of claim 31, further comprising means for differentiating between the previously connected party and the calling party in the combined voice stream.

35. The system of claim 34, further comprising means for combining the calling party voice stream into the combined voice stream at a lower level than the previously connected party voice stream.

36. The system of claim 31, wherein the calling party voice stream and the previously connected party voice stream comprise real-time transport protocol (RTP) packets.

37. The system of claim 31, wherein at least one of the previously connected party and the calling party are connected to the called party through a gateway on an analog phone.

38. The system of claim 31, further comprising:
   means for determining whether a monitoring feature is active for the called party; and
   means for combining the called party voice stream with the previously connected party voice stream to generate the combined voice stream for the called party if the monitoring feature is active.

39. The system of claim 31, further comprising:
   means for determining whether a monitoring feature for the called party is available to the calling party; and
   means for combining the calling party voice stream with the previously connected party voice stream to generate the combined voice stream for the called party if the monitoring feature is available to the calling party.

40. The system of claim 31, further comprising means for terminating combining of the calling party voice stream with the previously connected party voice stream to generate the combined voice stream for the called party in response to at least termination of a monitoring feature by the called party.

41. The system of claim 31, further comprising:
   means for establishing a return connection from the called party to the calling party while maintaining the call in response to at least a request by the called party; and
   means for directing a called party voice stream to the calling party.

42. The system of claim 41, further comprising means for terminating the call in response to at least a request by the called party.

43. The system of claim 42, further comprising means for terminating a voice mail recording of the calling party in response to at least termination of the call by the called party in favor of a connection with the calling party.

44. The system of claim 41, further comprising means for switching the called party voice stream to the calling party in response to at least a request by the called party.

45. The system of claim 44, further comprising means for switching the called party voice stream from the calling party back to the previously connected party in response to at least a call resumption request by the called party.

46. The system of claim 45, further comprising means for terminating the return connection in response to at least the call resumption request by the called party.

47. A call manager for a communications network, comprising:

a voice mail monitoring controller; and the voice mail monitoring controller operable to control mixing of a duplicate of a calling party voice stream being recorded by voice mail, for a called party on a call with a previously connected party, with a previously connected party voice stream to generate a combined voice stream for playing to the called party during the call.

48. The call manager of claim 47, the voice mail monitoring controller further operable to control mixing of the calling party voice stream with the previously connected party voice stream to differentiate between the previously connected party and the calling party in the combined voice stream.

49. The call manager of claim 47, the voice mail monitoring controller further operable to determine whether a monitoring feature is active for the called party and to initiate mixing of the calling party voice stream with the previously connected party voice stream to generate the combined voice stream for the called party if the monitoring feature is active.

50. The call manager of claim 47, the voice mail monitoring controller further operable to determine whether a monitoring feature for the called party is available to the calling party and to initiate mixing the calling party voice stream with the previously connected party voice stream to generate the combined voice stream for the called party if the monitoring feature is available to the calling party.

51. The call manager of claim 47, the voice mail monitoring controller further operable to terminate combining of the calling party voice stream with the previously connected party voice stream to generate the combined voice stream for the called party in response to at least termination of a monitoring feature by the called party.

52. The call manager of claim 47, the voice mail monitoring controller further operable to initiate establishment of a return connection from the called party to the calling party while maintaining the call in response to at least a request by the called party and to initiate direction of a called party voice stream to the calling party over the return connection.

53. The call manager of claim 52, the voice mail monitoring controller further operable to initiate switching of the called party voice stream from the previously connected party to the calling party in response to at least a request by the called party.

54. The call manager of claim 47, the voice mail monitoring controller further operable to switch the called party voice stream from the calling party back to the previously connected party in response to at least a call resumption request by the called party.

55. The call manager of claim 47, the voice mail monitoring controller further operable to initiate termination of the return connection in response to at least the call resumption request by the called party.

56. A real-time communication device, comprising:

a real-time voice mail monitoring feature; and the real-time voice mail monitoring feature operable to control mixing of a duplicate of a calling party voice stream being recorded by voice mail for a called party using the communication device, for a call with a previously connected party, with a previously connected party voice stream to generate a combined voice stream for playing to the called party during the call.

57. A real-time method for monitoring voice mail during an active call, comprising:

duplicating a calling party voice stream being recorded by voice mail for a called party on a call with a previously connected party;

mixing the duplicate calling party voice stream with a previously connected party voice stream to generate a combined voice stream for the called party;

playing the combined voice stream to the called party during the call;

in response to at least termination to a real-time voice mail monitoring feature by the called party, terminating mixing of the calling party voice stream with the previously connected voice stream;

in response to at least a request to talk to the calling party from the called party, establishing a return connection from the called party to the calling party and switching a called party voice stream to the calling party connection; and in response to a call resumption request by the called party, switching the call party voice stream back to the call and terminating the return connection.

58. The method of claim 57, further comprising, in response to at least accepting a connection with the calling party in place of the call, terminating the call and establishing a return connection to the calling party.

* * * * *